United States Patent
Abe et al.

(10) Patent No.: US 8,556,585 B2
(45) Date of Patent: Oct. 15, 2013

(54) COOLING FAN FOR DRIVING DEVICE AND COOLING FAN STRUCTURE

(75) Inventors: Kazuhisa Abe, Okayama (JP); Shnsuke Miwa, Okayama (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/476,146

(22) Filed: May 21, 2012

(65) Prior Publication Data

US 2012/0230831 A1    Sep. 13, 2012

Related U.S. Application Data

(63) Continuation of application No. PCT/JP2010/071905, filed on Dec. 7, 2010.

(30) Foreign Application Priority Data

Dec. 10, 2009  (JP) ................................. 2009-280087

(51) Int. Cl.
*F04D 29/38* (2006.01)
(52) U.S. Cl.
USPC ............................................ 416/185; 415/77
(58) Field of Classification Search
USPC ........ 415/77; 416/185, 189, 228, 234, 229 R, 416/182
See application file for complete search history.

(56) References Cited

U.S. PATENT DOCUMENTS

| 3,751,181 | A | * | 8/1973 | Hayashi | 416/132 R |
| 4,128,364 | A | * | 12/1978 | Papst et al. | 417/354 |
| 4,289,449 | A | * | 9/1981 | Frister | 416/185 |
| 4,856,470 | A | * | 8/1989 | Ishii et al. | 123/195 C |

FOREIGN PATENT DOCUMENTS

| JP | 60-188659 | 9/1985 |
| JP | 62-250842 | 10/1987 |
| JP | 2003-322224 | 11/2003 |

OTHER PUBLICATIONS

International Search Report mailed on Feb. 8, 2011.

* cited by examiner

*Primary Examiner* — Edward Look
*Assistant Examiner* — Liam McDowell
(74) *Attorney, Agent, or Firm* — IPUSA, PLLC

(57) ABSTRACT

A cooling fan for cooling a mechanical section of a driving device attached to a rotary shaft including a plurality of blades configured to generate an airflow toward an outside of the rotary shaft in directions along radius directions of the rotary shaft with rotation of the rotary shaft, and a plurality of ribs that have widths in directions crossing the blades, extend toward outsides along the radius directions with respect to a center axis of the rotary shaft, reinforce the corresponding plurality of blades, and are directed on a side of the mechanical section at tips of the plurality of ribs, wherein at least parts of the blades exist inside the ribs along the radius directions of the ribs.

5 Claims, 4 Drawing Sheets

COOLING FAN FOR DRIVING DEVICE AND COOLING FAN STRUCTURE

CROSS-REFERENCE TO RELATED APPLICATIONS

This application is a U.S. continuation application filed under 35 USC 111a and 365c of PCT application JP2010/071905, filed Dec. 7, 2010, which claims priority to Application Ser. No. 2009-280087, filed in Japan on Dec. 10, 2009. The foregoing applications are hereby incorporated by reference in their entirety.

BACKGROUND OF THE INVENTION

1. Field of the Invention

The present invention relates to a cooling fan for a driving device and a cooling fan structure.

2. Description of the Related Art

Patent Document 1 proposes a cooling structure in which a cooling fan 10 is provided in a reduction machine 1 as illustrated in FIG. 7. The cooling fan 10 is integrally attached to an input shaft 2 (a rotary shaft) rotating at a high speed. The cooling fan 10 has a blade 12 and a rib 14. Rotation of the blade causes air movement. The rib 14 is arranged on the side of a reduction machine with respect to the blade 12 and integrally formed with the blade 12. The rib 14 causes the blade 12 to be fixed to the input shaft 2 via a cooling fan attaching member 16.

An angle of installing the blade 12 of the cooling fan 10 is parallel with an axis direction O (a tilt of the blade 12 with respect to the axis direction is zero). The reason why the angle of the blade 12 is zero is to match cooling capabilities of the cooling fan 10 in both rotational directions because the input shaft 2 of the reduction machine 1 may rotate in positive and negative rotations. Therefore, it is not easy to improve the cooling capability of the cooling fan 10 used for the reduction machine 1 in comparison with a case where the rotation direction is only one (single) such as an electric fan.

Practically, the cooling fan 10 illustrated in Patent Document 1 may be used together with a fan hood 8 as illustrated in FIG. 6. Said differently, a wind generated by the cooling fan 10 is sent to an outside of the input shaft 102 of the reduction machine 1 in radius directions of the input shaft 102 by the rotation of the cooling fan 10. The wind sent to the outside of the input shaft 102 of the reduction machine 1 in radius directions (an arrow W5) of the input shaft 102 hits an inside 8A of the fan hood 8 which is provided to cover the cooling fan 10. Then, the wind direction is changed to a direction indicated by an arrow W6. By the above structure, the cooling fan 10 is configured to send the wind to a mechanical section of the reduction machine even if the rotation direction of the cooling fan 10 is changed. The mechanical section includes a main body casing 106 other than the input shaft 102 and component parts of the reduction machine including a bearing casing 104.

[Patent Document 1] Japanese Laid-Open Patent Application No. 2003-322224

However, if the amount of the wind sent to the outside in the radius directions is sufficient to increase the wind speed, when the wind direction is changed by the fan hood 8, the wind amount and the wind speed are decreased. In addition, a distance d2 between the cooling fan 10 and the main body casing 106 is elongated, to thereby further reduce the wind amount and the wind speed when the wind reaches the main body casing 106 of the reduction machine. Therefore, it is difficult to obtain a sufficient cooling capability for the reduction machine 1 or the like with the example cooling fan 10, and therefore it is difficult to improve heat rating of the reduction machine 1 or the like. Further, it is possible to increase the size of the cooling fan 10 in order to improve the cooling capability. However, in this case, the size of an entire driving device including the fan hood may be excessively increased.

[Patent Document 1] Japanese Laid-Open Patent Application No. 2003-322224

SUMMARY OF THE INVENTION

Accordingly, embodiments are provided to solve the above problems. The object of the present invention is to provide a cooling fan for a driving device and a cooling fan structure enabling heat rating of the driving device being improved.

More specifically, the embodiments of the present invention may provide a cooling fan for cooling a mechanical section of a driving device attached to a rotary shaft including a plurality of blades configured to generate an airflow toward an outside of the rotary shaft in directions along radius directions of the rotary shaft with rotation of the rotary shaft, and a plurality of ribs that have widths in directions crossing the blades, extend toward outsides along the radius directions with respect to a center axis of the rotary shaft, reinforce the corresponding plurality of blades, and are directed on a side of the mechanical section at tips of the plurality of ribs, wherein at least parts of the blades exist inside the ribs along the radius directions of the ribs.

The cooling fan of the embodiment includes plural blades and ribs configured to have widths in directions crossing the corresponding blades and extend toward an outside in the radius direction from the center of the rotary shaft for reinforcing the plural blades. The tips of the ribs are directed toward the mechanical section and at least parts of the blades exist in insides in the radius direction of the ribs. Therefore, when the rotary shaft rotates, air flows toward the outside of the rotary shaft in the radius directions with the blades existing in the inside along the radius directions in a manner similar to the example blades. Because the rib is widened in a direction crossing the blade, the air flowing to the outside in the radius direction with the blades is directed by the ribs. The tips of the ribs are directed to the mechanical section. Therefore, the air flowing toward the outside along the radius direction resultantly flows toward the mechanical section. Said differently, the wind generated by the blade existing in the insides of the ribs along the radius direction is directly sent to the side of the mechanical section without the example fan hood. Therefore, it is possible to cool the mechanical section without reducing the air volume and the wind speed. The ribs widened in the directions crossing the blades reinforce the blades. Thus, a cooling fan having high rigidity is realized. Therefore, probability of deformation and breakage is lowered even when a rotational load is high and the lifetime of the cooling fan can be increased.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

A description is given below, with reference to the FIG. 1 through FIG. 7 of embodiments of the present invention.

Reference symbols typically designate as follows:
1, 100: reduction machine;
2, 200: input shaft;
8, 108: fan hood;
10, 100: cooling fan;
12, 112: blade;
14, 114: rib;
16, 116: cooling fan attaching member;
101: key;
104: bearing casing;
106: main body casing;
108A: inner periphery of fan hood;
112A: inner blade;
112B: outer blade;
112C: outer shape of blades in radial directions;
114A: ring portion;
114B: extending portion;
114C: tip portion;
118, 126: bolt;
120: coupling mechanism;
122: reduction machine side member; and
124: motor side member.

Figure 1:
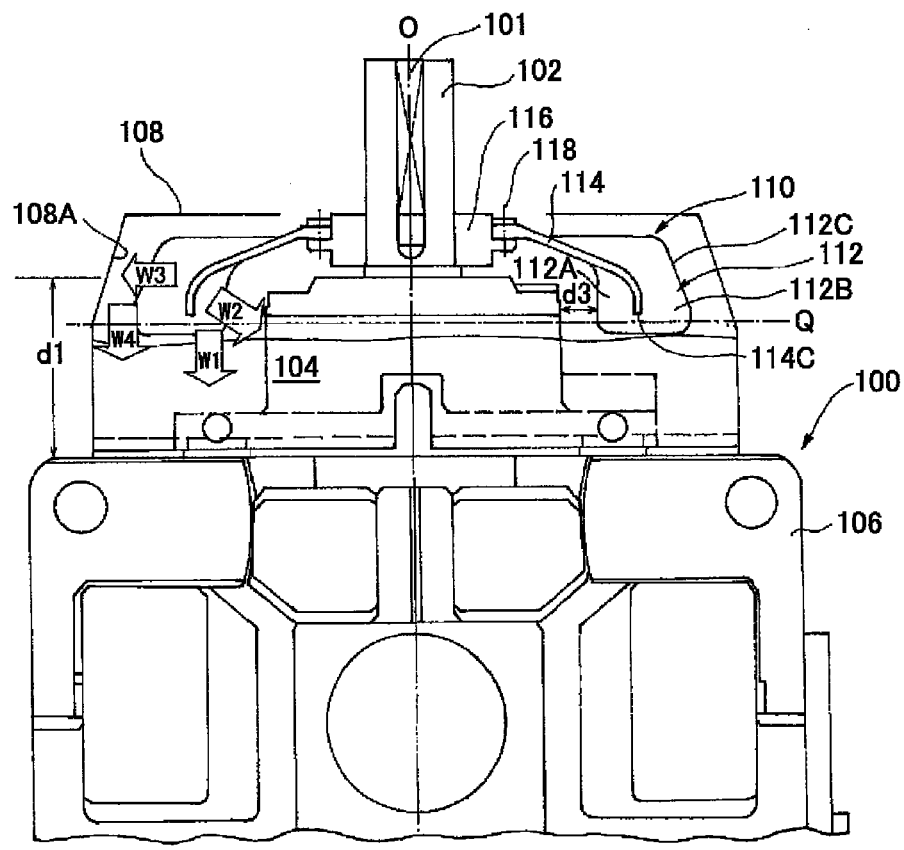
FIG. 1 is a cross-sectional view of a part of a reduction machine having a cooling fan of an embodiment of the present invention.

FIG. 1 is a cross-sectional view of a part of a reduction machine having a cooling fan of an embodiment of the present invention.

The reduction machine (the driving device) 100 is connected to the driving shaft of a motor (not illustrated). The reduction machine 100 includes an input shaft (a rotary shaft) 102 which receives power from the motor via a key 101, a bearing for supporting the input shaft 102, plural bearings and plural gears. Among these components, the bearing for supporting the input shaft 102 is accommodated in a bearing casing 104. The other components are accommodated in the main body casing 106. In the reduction machine 100, a structure except for the input shaft 102 such as the bearing casing 104 and the main body casing 106 is generally referred to as a mechanical section.

The bearing casing 104 is formed to protrude from the main body casing 106 to the side of the motor. Because the input shaft 102 rotates at a high speed, the temperature of the bearing inside the bearing casing 104 greatly increases by friction. Therefore, a thermal load on the reduction machine 100 is severe.

The cooling fan 110 for cooling the mechanical section of the reduction machine 100 is integrally formed with the input shaft 102. The cooling fan 110 includes the plural blades 112, the ribs 114 and the cooling fan attaching member 116 holding the plural blades 112 and the ribs 114.

An angle of attaching the blades 112 is parallel to a shaft direction O of the input shaft 102. Therefore, the blades 112 generate an air flow directing toward the outsides along the radius directions of the input shaft with rotation of the input shaft 102.

The ribs 114 are widened in directions crossing the blades 112 and elongated toward the outsides along the radius directions with respect to the center of the input shaft 102. The ribs 114 reinforce the corresponding blades 112. The tips of the ribs 114 are directed toward the mechanical section. At least parts of the blades 112 exist inside the tips of the ribs 114 along the radius directions of the ribs 114.

Figure 2:
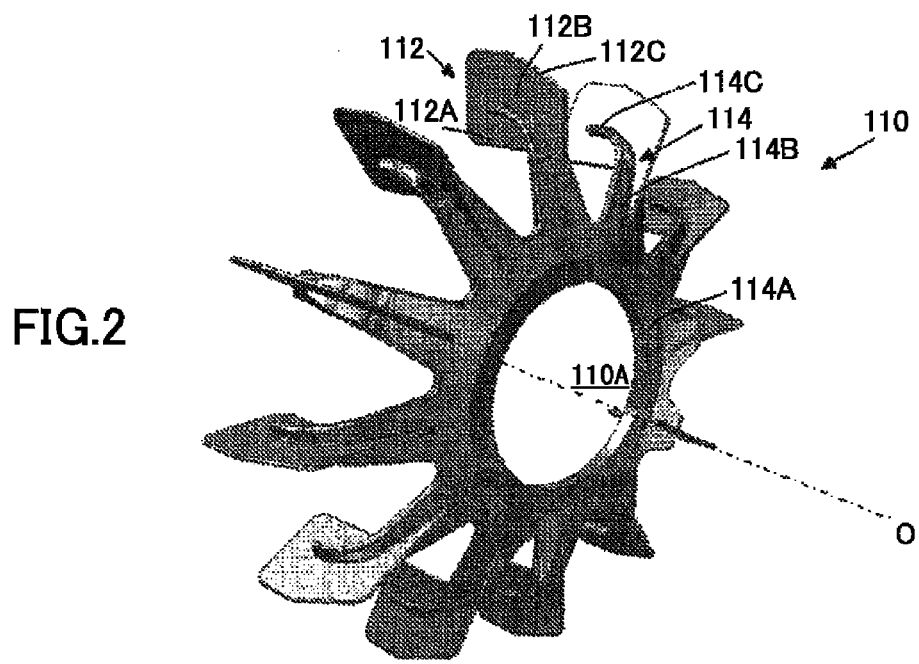
FIG. 2 is a perspective view of the cooling fan.
Figure 3:
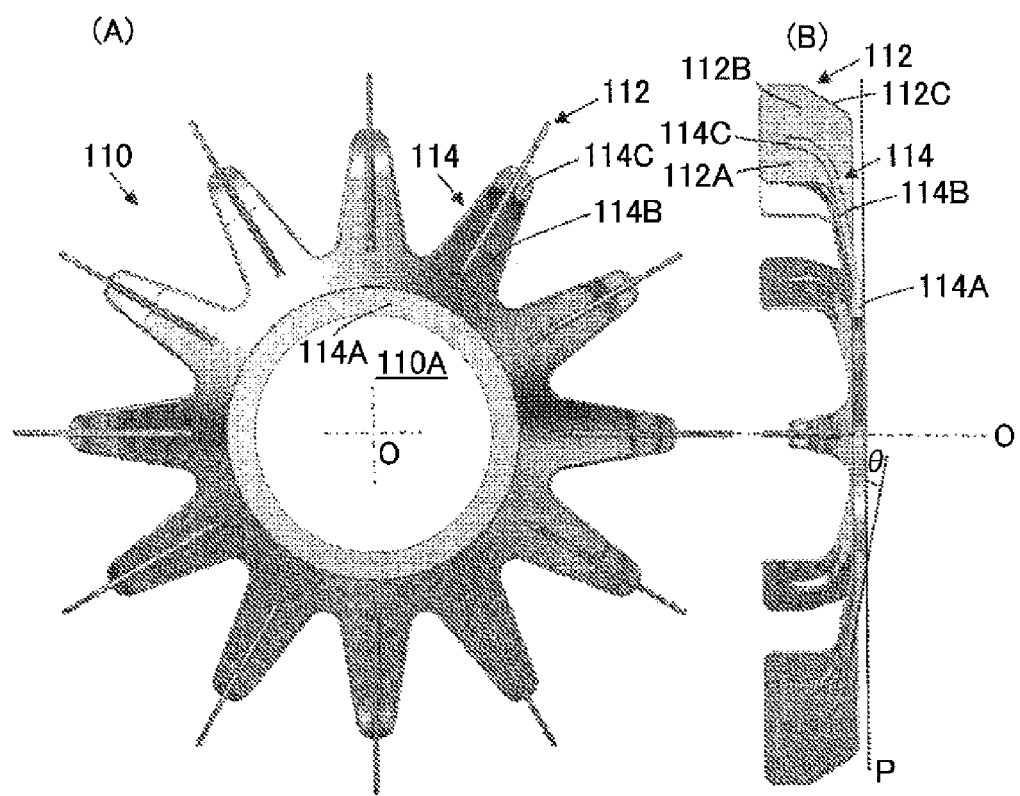
FIG. 3 is a front view of the cooling fan in (A) and a side cross-sectional view of the cooling fan in (B)

Referring to FIG. 2 and FIG. 3, the blade 112 and the rib 114 are further described in detail.

FIG. 2 and FIG. 3 are a perspective view, a front view and a side cross-sectional view of the cooling fan omitting the cooling fan attaching member 116.

The blade 112 includes an inner blade 112A and an outer blade 112B. The inner blade 112A exists inside the rib 114 along the radius direction, and the outer blade 112B exists outside the rib 114 along the radius direction. The inner blade 112A and the outer blade 112B are arranged on a single plane. At a position indicated by a reference symbol Q, the blades 112 including the inner blades 112A are provided to surround an outer periphery of the bearing casing 104 supporting the input shaft 102 in its radial directions.

The rib 114 includes a ring portion 114A, an extending portion 114B and the tip portion 114C. The ring portion 114A has a circular opening 110A in an inside of the ring portion. The cooling fan attaching member 116 is fixed to the circular opening 110A. Referring to FIG. 2 and FIG. 3, a bolt hole for fixing the ring portion 114A to the cooling fan attaching member 116 is omitted. The extending portion 114B is integrally formed with the ring portion 114A while maintaining continuity in shapes of the extending portion 114B and the ring portion 114 without a seam. The extending portion 114B has a width in a direction crossing the blade 112. In the vicinity of the ring portion 114A, the extending portion 114B is integrally shaped like a circular ring while maintaining continuity in shapes of the extending portion 114B and the ring portion 114 without seams. The extending portion 114B is elongated toward the outside along the radius direction while tilting toward the mechanical section of the reduction machine from a reference plane P by a tilt angle θ. The width of the extending portion 114B (the width crossing the blade 112) is narrowed toward the tip of the extending portion 114B. Simultaneously, the extending portion 114B curves toward the tip of the extending portion 114B. The tip portion 114C and the extending portion 114B are integrally formed while maintaining continuity in the shapes of the extending portion 114B and the tip portion 114C without a seam. The tip portion 114C has a width in a direction crossing the blade 112. The tip portion 114C is directed substantially in parallel with the shaft direction O. Said differently, within the embodiment, the rib 114 curves within an angle not exceeding 90 degrees and directs the mechanical section of the reduction machine 100 so that the tip portion 114C of the rib 114 is substantially in parallel with the shaft direction O.

The blade 112 and the rib 114 are integrally formed so as to mutually cross. Therefore, the rib 114 reinforces the blade 112 to thereby realize the cooling fan 110 having high rigidity even if the blade 112 is thin.

The cooling fan 110 is attached to the input shaft 102. Specifically, the rib 114 of the cooling fan 110 is retained by the cooling fan attaching member (a member integrally rotatable with the input shaft 102) via a bolt (a retaining portion) 118. The plural blades 112 of the cooling fan 110 exists on the side of the mechanical section of the reduction machine 100 along the shaft direction O with respect to the retaining position of the cooling fan 110 by the bolt 118.

Further, the fan hood 108, which is arranged in the outside of the cooling fan 110 and also covers the bearing casing 104, is attached to the main body casing 106 of the reduction machine 100 by bolts (not illustrated). As illustrated in FIG. 1, a shape 112C of an outside in the radius directions of the outer blades 112B is substantially in parallel with a shape of an inner periphery 108A of the fan hood 108. Said differently, the contour of the shape 112O is along the contour of the shape of the inner periphery 108A.

Next, a function of the reduction machine 100 of the embodiment is described.

When the motor shaft of the motor (not illustrated) rotates, the input shaft 102 connected to the motor shaft via the key 101 is rotated. If the input shaft 102 is rotated, the output shaft is rotated via plural gears (not illustrated).

At this time, the cooling fan 110 is integrally rotated with the input shaft 102. Then, the air flows toward the outsides of the input shaft 102 along the radius directions by the inner blades 112A, which exist in the insides of the ribs 114 along the radius directions of the ribs 114. Because the rib 114 is widened in the direction crossing the blade 112, the air outward flown by the inner blade 112A along the radius direction is directed by the rib 114. The tip portion 114O of the rib 114 is directed toward the mechanical section. Therefore, the air outward flowing along the radius directions resultantly flows toward the mechanical section. Said differently, the wind (indicated by an arrow W1) generated by the inner blade 112A existing in the insides of the ribs along the radius direction is directly sent to the side of the mechanical section without a fan hood. Therefore, it is possible to cool the mechanical section without reducing the air volume and the wind speed. The ribs 114 widened in the directions crossing the corresponding blades 112 reinforce the blades 112. Thus, the cooling fan 110 having high rigidity is realized. Therefore, probability of deformation and breakage is lowered even when a rotational load is high and the lifetime of the cooling fan 110 can be elongated.

At the same time, the plural inner blades 112A existing inside the ribs 114 along the radius directions of the ribs 114 are provided so as to surround the outer periphery of the bearing casing 104 which accommodate the bearing supporting the input shaft 102. Therefore, it is possible to directly send wind (indicated by an arrow W2) to the bearing casing 104. Further, the bearing casing 104 is formed to protrude from the main body casing 106 toward the motor. Therefore, it is possible to increase an area for dissipating heat and shorten a distance d3 between the cooling fan 110 and the bearing casing 104. Therefore, it is possible to effectively cool the bearing casing 104. At the same time, the area of the blade 112 can be increased on the side of the mechanical section and the distance d1 between the blade 112 and the mechanical section (the main body casing 106) can be shortened. Therefore, it is possible to send the wind to the mechanical section (the main body casing) without weakening the air volume and the wind speed.

Further, the outer blades 112B exist outside the ribs 114 along the radius directions. Said differently, the ribs 114 are not arranged in the outermost periphery of the blades 112. Therefore, it is possible to increase a space between the ribs 114 and the inner periphery 108A of the fan hood 108 thereby increasing a suction amount of air from the motor to the cooling fan 110. As a result, the air volume on the side of the mechanical section can be further increased. The air (indicated by an arrow W3) directed outside the ribs 114 along the radius directions with the outer blades 112B provided outside the radius directions of the ribs 114 can be turned as the wind (indicated by an arrow W4 in FIG. 1) directed toward the mechanical section. Therefore, it is possible to provide a larger air volume to the mechanical section using the wind (indicated by the arrow W1) generated by the inner blades 112A provided inside the ribs 114 along the radius directions of the ribs 114 and the wind (indicated by the arrow W4) generated by the outer blades 112B provided outside the ribs 114 along the radius directions of the ribs 114.

The fan hood 108 covering the outer periphery of the plural blades 112 is provided, and the outside shape 112C of the outer blades 112E is along the shape of the inner periphery 108A of the fan hood 108. Therefore, the width of the flow path of the air scarcely changes thereby reducing vibration generated by rotation of the cooling fan 110. At the same time, a loss of the air flow caused by collision of the air with the fan hood 108 can be decreased. Further, since the outer shape 112 of the blades 112 in the radius directions is along the inner shape of the fan hood 108, a currently available fan hood 108 can be used as is (without modification). Said differently, it is possible to improve the cooling capability by changing only the cooling fan 110 of currently available reduction machines.

By enabling installing the reduction machine 100 upside-down, it becomes possible to deal with a change in the specification of machinery. In this case, it is difficult to deal with this change using the conventional technique. However, it may be possible to ensure a supply of lubrication oil to portions requiring lubrication, such as a bearing, by increasing the amount of lubrication oil greater than an ordinarily used amount. If the area of the gears (not illustrated) or the like immersed in the lubrication oil increases, the temperature of the lubrication oil may be increased by churning with the gears or the like. Therefore, it is necessary to strongly cool the lubrication oil to reduce the increased oil temperature. However, because the conventional cooling fan does not have sufficient cooling capability, there may be cases where the heat rating of the reduction machine is limited by the capability of the cooling fan. By using the cooling fan 110 of the embodiment, the oil amount of the lubrication oil is increased to thereby enable installing the reduction machine 100 upside-down. Thus, the heat rating of the reduction machine 100 can be improved.

Since the plural blades 112 exist on the side of the mechanical section along the axis direction O with respect to the retaining position of the cooling fan 110 with the bolts 118, the blades 112 do not prevent the cooling fan 110 from being retained by the cooling fan attaching member 116.

Figure 4:
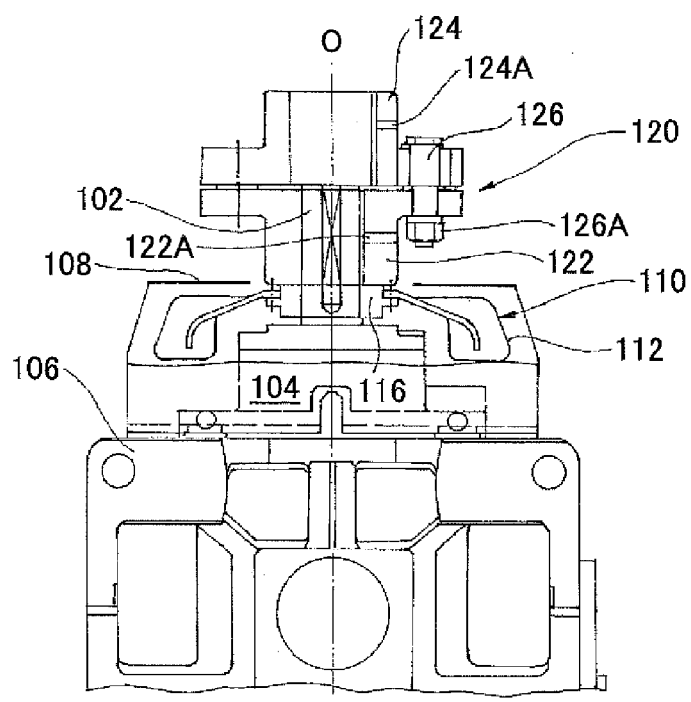
FIG. 4 is a cross-sectional view of the structure illustrated in FIG. 1 and a coupling mechanism connected to the structure.

Next, a case where the motor shaft is coupled to the input shaft 102 by a coupling mechanism is assumed. For example, as illustrated in FIG. 4, the coupling mechanism 120 includes a reduction machine side member 122 attached to the input shaft 102 of the reduction machine 100, a motor side member 124 attached to the motor shaft, a motor side, and a bolt 126 for integrally fixing the reduction machine side member 122 to the motor side member 124. The reduction machine side member 122 and the motor side member 124 are fixed to the input shaft 102 of the reduction machine 100 and the motor shaft by pins (not illustrated) or the like inserted into attaching holes 122A and 124A, respectively.

Figure 5:
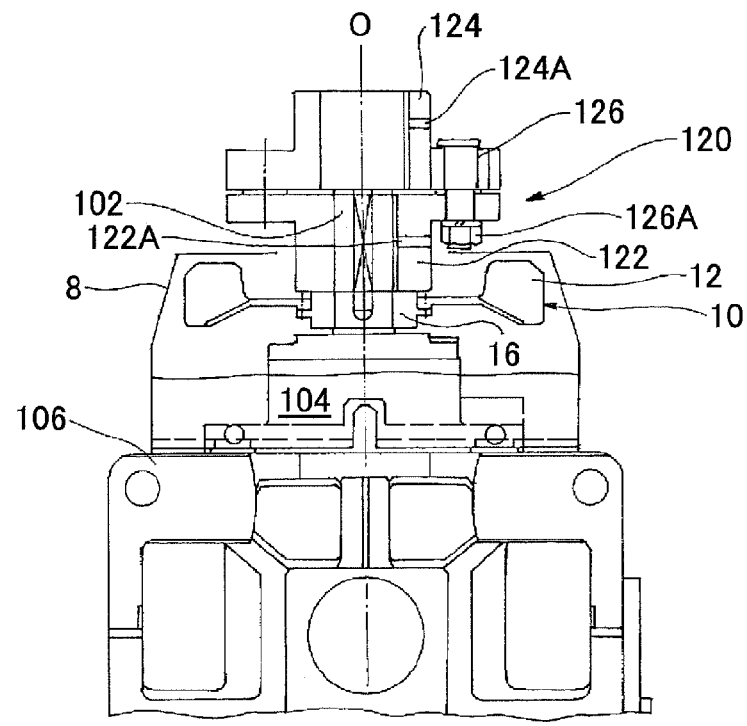
FIG. 5 is a cross-sectional view of a combination of a reduction machine to which an example cooling fan is applied and a coupling mechanism.
Figure 6:
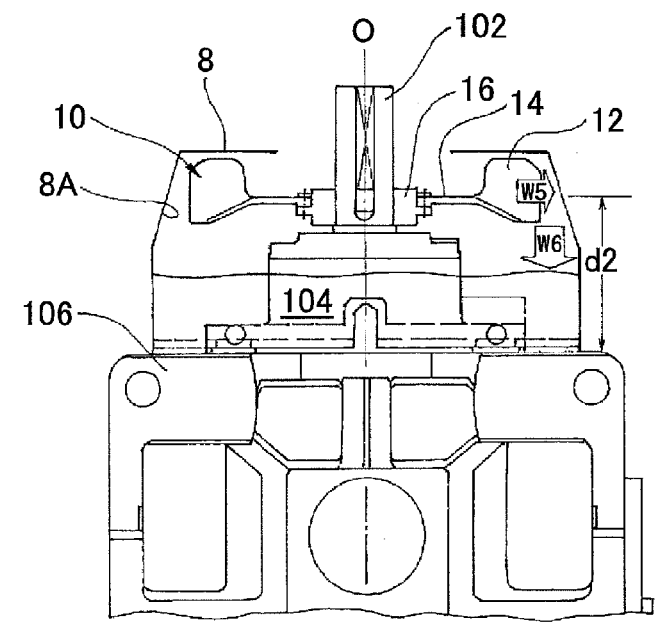
FIG. 6 is a cross-sectional view of a part of the reduction machine to which an example cooling fan is applied.
Figure 7:
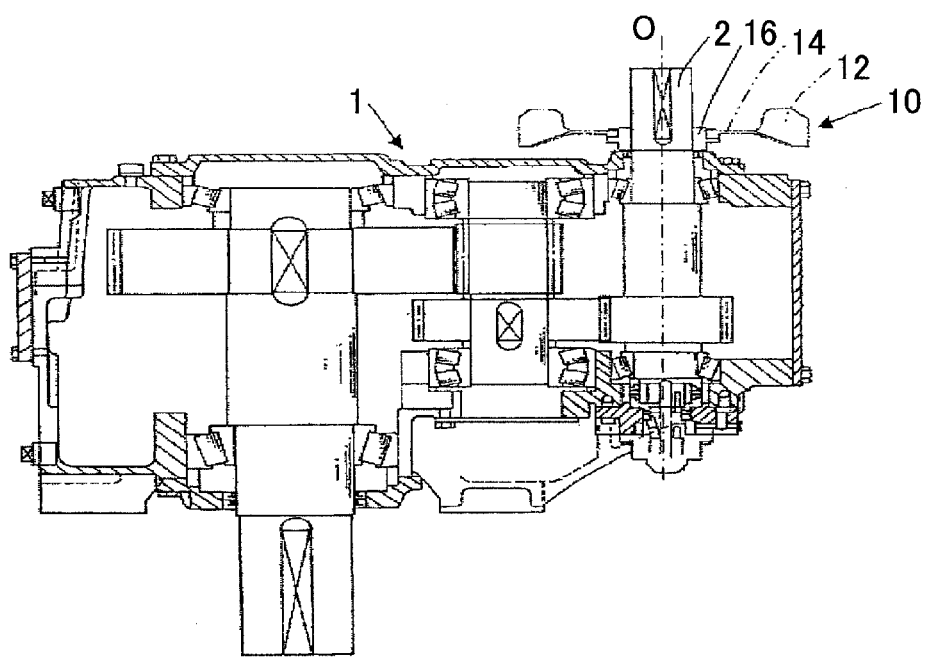
FIG. 7 is a cross-sectional view of a reduction machine to which the example cooling fan is applied.

Referring to FIG. 5, when the conventional cooling fan 10 is applied to the reduction machine 100, the blades 12 of the cooling fan 10 are positioned in the vicinity of the attaching hole 122A of the reduction machine side member 122 and a nut 126A for fixing the bolt 126. In this case, a space for fixing the pin to the attaching hole 122A and a space for fastening the nut 126A are narrowed. Therefore, attaching work, detaching work and coupling work of the coupling mechanism 120 may become very difficult. On the contrary thereto, with the cooling fan of the embodiment, the plural blades 112 of the cooling fan 110 exists on the side of the mechanical section of the reduction machine 100 along the shaft direction O with respect to the retaining position of the cooling fan 110 with the bolt 118. Said differently, as illustrated in FIG. 4, the blades 112 do not protrude on the side of the motor from the retaining position of the cooling fan 110 with the bolt 118. Therefore, a distance from the attaching hole 122A and the nut 126A to the back end of the blade on the side of the motor can be elongated. Thus, the space for attaching the pin to the attaching hole 122A and the space for fastening the nut 126A can be ensured to thereby facilitate the coupling of the motor shaft to the input shaft 102b.

A mode of reducing speed in the reduction machine of the embodiment is not specifically limited.

With the above embodiment, the input shaft 102 is selected as the rotary shaft for attaching the cooling fan 110 is selected. However, the rotary shaft to be attached in the present invention is not specifically limited to the input shaft. The bearing casing needs not to protrude on the side of the input shaft.

Further, with the embodiment, the outer blades 112B exist on the outside of the rib 114 in the radius direction, the embodiment of the present invention is not limited to this. The blades may exist only the inside of the ribs along the radius directions of the ribs. In this case, it is possible to effectively send the wind in an intended direction.

Further, with the embodiment, the reduction machined is the driving device. However, the embodiment is not specifically limited thereto. For example, the driving device may be a driving source such as a motor, a linkage or the like.

Further, with the embodiment, the fan hood is used. However, since the rib has a function of the fan hood, the fan hood is not always necessary in the present invention. Further, with the embodiment, the fan hood separates from the casing. However, it is not limited so. In a case where the cooling fan is built in the casing or the like, the casing has the function of the fan hood of mainly changing the direction of the wind. Therefore, the outer shape of the blades in the radial directions may be determined based on the function of the fan hood of mainly changing the direction of the wind.

Further, with the embodiment, an angle of installing the blades 112 is parallel with the axis direction O. However, the present invention is not limited thereto. The angle of installing the blades may not be parallel with the axis direction. In this case, the present invention is applicable to a use where the rotation direction is determined, and a use where an inverse rotation is seldom carried out.

The ribs 114 need not to always have the ring portion 114A. The extending portion needs not to always have the portion shaped like a circular ring in the extending portion 114B. Further, the blades may be directly retained by the cooling fan attaching member. Meanwhile, the outer periphery of the blades may be shaped like a cylinder integrally formed around the circle's perimeter.

Further, within the embodiment, the ribs 114 of the cooling fan 110 are retained by the cooling fan attaching member 116 via the bolts 118 which are retaining members. However, the present invention is not limited thereto. For example, the retaining members are not limited to the bolts. Further, the cooling fan may be directly retained by the input shaft via the retaining members.

Further, with the embodiment, the blades 112 and the ribs 114 are integrally formed so as to perpendicularly cross each other. However, the blades 112 may cross the ribs 114 so as to be non-parallel with each other. This is because if there is a crossing angle, the ribs can reinforce the blades.

The present invention is applicable to a reduction machine used under operating conditions such as an environment or a position where there is a severe thermal load and increment or decrement of the amount of lubrication oil and a driving device such as a motor.

According to the embodiments, a driving device such as a reduction machine can be effectively cooled and a heat rating of the driving device can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present invention have been described in detail, it should be understood that the various changes, substitutions, and alterations could be made hereto without departing from the spirit and scope of the invention.

What is claimed is:

1. A cooling fan for cooling a mechanical section of a driving device attached to a rotary shaft, the cooling fan comprising:
    a plurality of blades configured to generate an airflow toward an outside of the rotary shaft along radius directions of the rotary shaft with rotation of the rotary shaft; and
    a plurality of ribs that have widths in directions crossing the blades, extend toward outsides along the radius directions with respect to a center axis of the rotary shaft, and reinforce the corresponding plurality of blades,
    wherein tips of the plurality of ribs are directed to a side of the mechanical section in parallel with an axis direction of the rotary shaft,
    wherein at least parts of the plurality of blades exist inside the ribs along the radius directions of the ribs.

2. The cooling fan for cooling the mechanical section of the driving device according to claim 1,
    wherein the plurality of blades exist on an outside along the radius directions of the plurality of ribs.

3. A cooling fan structure for the driving device, comprising:
    the cooling fan according to claim 1,
    wherein the cooling fan is retained by the rotary shaft via a retaining portion or by a member which is integrally formed with the rotary shaft so as to rotate together with the rotary shaft, and
    the plurality of blades of the cooling fan exist on a side of the mechanical section along an axis direction with respect to a retaining position of the retaining member of the cooling fan.

4. The cooling fan structure for the driving device according to claim 3,
    wherein at least a part of the plurality of blades is provided so as to surround a bearing casing accommodating an outer periphery of a bearing casing accommodating a bearing which supports the rotary shaft.

5. A cooling fan structure for the driving device, comprising:
- the cooling fan according to claim 1,
- wherein the cooling fan is retained by the rotary shaft via a retaining portion or by a member which is integrally formed with the rotary shaft so as to rotate together with the rotary shaft,
- the plurality of blades of the cooling fan exist on a side of the mechanical section along the axis direction with respect to a retaining position of the retaining member of the cooling fan,
- the cooling fan is provided with a fan hood for covering an outer periphery of the plurality of blades, and
- an outer shape of the plurality of blades in the radial directions is along an inner periphery of the fan hood.

* * * * *